Jan. 6, 1970          J. HICKL          3,488,112
MAGAZINE-LOADING MOTION PICTURE CAMERA
Filed Sept. 25, 1967                    2 Sheets-Sheet 1

Jiri Hickl
INVENTOR.
By Richard Low
ag't

Jiri Hickl
INVENTOR.

United States Patent Office 3,488,112
Patented Jan. 6, 1970

3,488,112
MAGAZINE-LOADING MOTION PICTURE CAMERA
Jiri Hickl, Brno, Czechoslovakia, assignor to MEOPTA, norodni podnik, Prerov, Czechoslovakia
Filed Sept. 25, 1967, Ser. No. 670,063
Claims priority, application Czechoslovakia,
Sept. 30, 1966, 6,264/66
Int. Cl. G03b 23/02
U.S. Cl. 352—72         8 Claims

ABSTRACT OF THE DISCLOSURE

A magazine-loading motion picture camera in which the magazine is inserted into the cavity of the camera casing through an access opening provided with a swinging door and is received in a guide sleeve pivotally mounted in the cavity and connected to the door by a linkage which pivots the sleeve from an inoperative or loading position in alignment with the access opening to an operative position when the door is closed, the magazine being aligned with the optical axis of the camera in the operative sleeve position.

BACKGROUND OF THE INVENTION

This invention relates to magazine-loading motion picture cameras, and particularly to improved locating means for aligning an inserted magazine with the axis of the optical system on the camera casing.

Conventional film magazines for motion picture cameras are provided with supply and take-up reels which are operated by a drive mechanism on the camera casing through a coupling having engageable parts on a side wall of the casing and on a side wall of the camera. It is necessary, during insertion of the magazine into the casing, to engage the coupling of the drive arrangement and also to align an exposed frame of film at the front end of the magazine with the optical axis of the camera, that is, of its optical system. The proper alignment of the magazine front with the optical axis is conventionally maintained by abutments and by resilient elements which urge the inserted magazine against the abutments.

Some known magazine loading cameras of the type described have an access opening in a side wall through which the magazine is inserted obliquely to the optical axis until its front end engages an abutment on the casing, and by thereafter swinging the magazine about its abuttingly engaged end until the drive coupling is engaged. The operation can be performed successfully only with an amount of skill not possessed by all amateur photographers, and misalignment of the parts of the drive coupling, misalignment of the magazine with the optical axis of the camera, and damage to the camera or the magazine may result from an unsuccessful attempt at locating the magazine in the camera casing.

The object of the invention is the provision of a magazine-loading motion picture camera in which the magazine is properly located in the casing during insertion in a practically foolproof manner.

SUMMARY OF THE INVENTION

The camera of the invention is provided with a guide member dimensioned to receive a magazine in conforming engagement. The guide member is secured in the cavity of the camera casing for movement between an inoperative and an operative position. In the inoperative position, the guide member is aligned with the access opening of the camera casing for receiving the magazine through the opening. When the guide member is in its operative position, it holds the received magazine in alignment with the optical axis of the camera, that is, of its optical system. The guide member is connected by a linkage to a door on the camera casing which is movable toward and away from a position in which it closes the access opening, the connection being such that the guide member moves from the inoperative to the operative position when the door is moved toward its closing position.

A magazine may therefore be received by the guide member through the access opening when the door is moved away from its closing position, and the magazine is located in alignment with the aforementioned optical axis when the door is moved to the closing position.

Other features, additional objects, and many of the attendant advantages of this invention will readily be appreciated as the same is better understood by reference to the following detailed description of preferred embodiments when considered in connection with the annexed drawing.

BRIEF DESCRIPTION OF THE PREFERRED EMBODIMENTS

Figure 1:
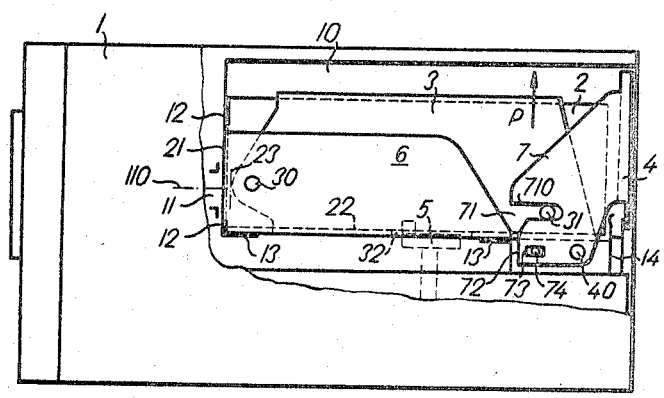
FIG. 1 shows a motion picture camera of the invention in top view, a portion of the camera casing being broken away to reveal internal structure, and the camera being in the operative condition.

Referring now to the drawing in detail, and initially to FIG. 1 there is seen a motion picture camera whose casing 1 has a cavity 10 partly occupied by a magazine 2. The magazine is held in proper alignment with the optical axis 110 of the camera in a guide sleeve 3 while a rotatable claw 5 of a motor drive, not otherwise shown, engages a mating non-illustrated coupling element in the side wall 22 of the magazine 2, as is conventional, the non-illustrated motor of the drive being mounted in the casing 1.

The sleeve 3 is secured to the casing 1 by means of a sheet metal frame 6 fixedly fastened to the casing 1 and by two coaxial pivot pins 30 mounted on the sleeve 3 and engaging openings in the frame 6 near the optical system on the front wall of the camera casing of which only a film gate 11 is indicated in the drawing, the lenses, shutter, and other elements of the optical system being obscured by the casing 1.

The exposed film frame 23 of the magazine 2 is held in proper axial alignment with the optical system by a spring 14 on the casing 1 which urges the magazine 2 to slide forward or axially in the sleeve 3 until the front wall 21 of the magazine abuts against resilient abutments 12 on the wall of the casing 1 which forwardly bounds the cavity 10. The angular position of the guide sleeve 3 is defined by similar abutments 13 on the side wall of the cavity 10 through which the drive claw 5 projects into an opening 32 of the sleeve 3 and into the magazine 2.

An access opening in the rear wall of the casing 1 is closed by a door 4 mounted on a sheet metal bracket 7. The bracket is fastened to the casing 1 by a pivot pin 40 on which the door 4 may swing between the closing position shown in FIG. 1 and the open position seen in FIG. 2. A cam follower pin 31 on the top face of the guide sleeve 3 travels from a slot 71 in the bracket 7 along a wall 710 of the slot and over a convexly arcuate cam face 72 of the bracket 7 when the door 4 is swung open so that the sleeve 3 is pivoted in the direction of the arrow P in FIG. 1 from the operative position shown in that figure by the pin 31 and the cooperating elements of the bracket 7.

Figure 2:
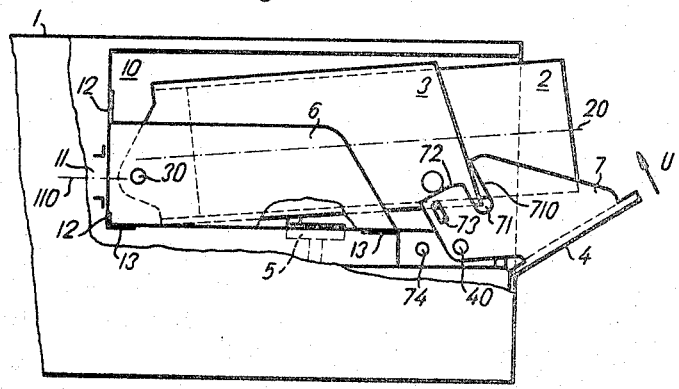
FIG. 2 illustrates the camera of FIG. 1 in the loading or inoperative position.

When the door 4 is swung from the opening position of FIG. 2 toward the closing position in the direction of the arrow U in FIG. 2, the pin 31 strikes the wall 710 of the slot 71 and is guided into the slot until the longitudinal axis 20 of the magazine received in the guide sleeve 3 is parallel to the optical axis 110 of the optical system when the sleeve engages the abutments 13. A spring-loaded latch 74 movably mounted on the casing 1 engages an opening 73 in the bracket 7 in the operative position of the sleeve 3. The latch 74 is attached to a non-illustrated button which projects from the bottom wall of the magazine and permits the latch to be withdrawn, thereby releasing the door 4 from the closing position and the guide sleeve 3 from the inoperative position.

Figure 3:
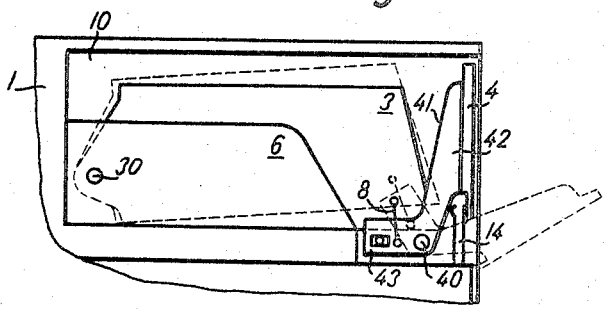
FIG. 3 shows a modified embodiment of the invention in a view corresponding to that of FIG. 1 (solid lines) and FIG. 2 (broken lines)

The modified embodiment of the invention whose operative position is shown in FIG. 3 in fully drawn lines is closely similar or identical with that described above except for the mounting of the door 4 and its linkage connection to the guide sleeve 3 which is shown without a magazine 2 in FIG. 3 for the sake of simplicity.

The pivot pin 40 supports an angle lever 41 whose arm 42 is fixedly attached to the door 4. The other arm 43 of the lever 41 is connected to the sleeve 3 by a hingedly fastened link 8 so that the sleeve 3 moves angularly on the pivot pins 30 toward the inoperative position shown in broken lines when the door is swung open. An opening in the lever arm 43 accommodates a latch as described above with reference to the opening 73 in the bracket 7.

Figure 4:
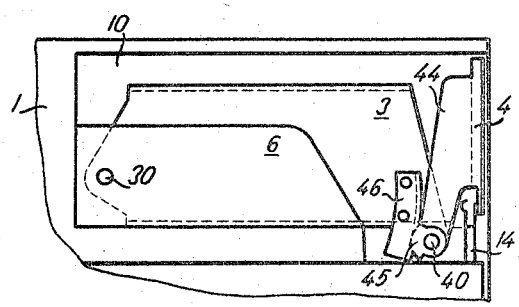
FIGS. 4 and 5 show further modifications of the camera of the invention in views corresponding to that of FIG. 1.

Yet another modified linkage between the door 4 and the guide sleeve 3 is shown in FIG. 4. The door 4 is mounted on an arm 44 pivoted on the pin 40 which also carries an arcuate gear segment 45 whose arc is centered in the axis of the pin 40 and which meshingly engages a gear segment 46 fixedly fastened to the sleeve 3, and having its center of curvature in the axis of the pin 30. When the door 4 swings open, the sleeve 3 is pivoted by the engaged segments into the inoperative position, not shown in FIG. 4.

Figure 5:
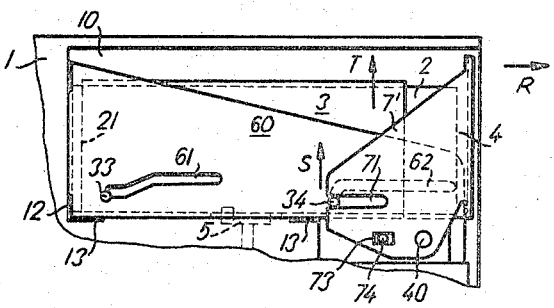

FIG. 5 shows a further variation of the camera of the invention. Two opposite walls of a sheet metal frame 60 in the cavity 10 are formed with elongated slots 61, 62, only one wall being seen in the drawing. Coaxial pins 33 on the top and bottom walls of the guide sleeve 3 near the front wall 21 of the magazine 2 received in the sleeve 3 engage the slots 61, while the slots 62 are engaged by pins 34 on the rear part of the sleeve which pins also extend into slots 71 of a bracket 7' pivoted on a pin 40 and carrying the door 4.

When the door is swung open in the direction of the arrow R from the closing position illustrated in FIG. 5, the pin 34 travels clockwise about the axis of the pin 40, as viewed in FIG. 5, the dominant component of the movement initially being in the direction of the arrow S, whereby the magazine is pivoted on the pin 33 as indicated by the arrow T and the movement of the pin 33 in the slot 61 is at first negligible.

When the door 4 opens further, the pin 34 which is entrained in the slot 71 enters a portion of the slot 62 which is approximately parallel to the longitudinal magazine axis, and the sleeve 3 with the magazine 2 received therein moves away from the abutments 12 and outward of the casing through the access opening no longer obstructed by the door 4, thereby facilitating insertion or removal of a magazine into the guide sleeve 3. The opposite sequence of events takes place during movement of the door 4 toward the closing position in which the door 4 and the sleeve 3 may be locked by a latch 74 engaging an opening 73 in the bracket 7'.

Figure 6:
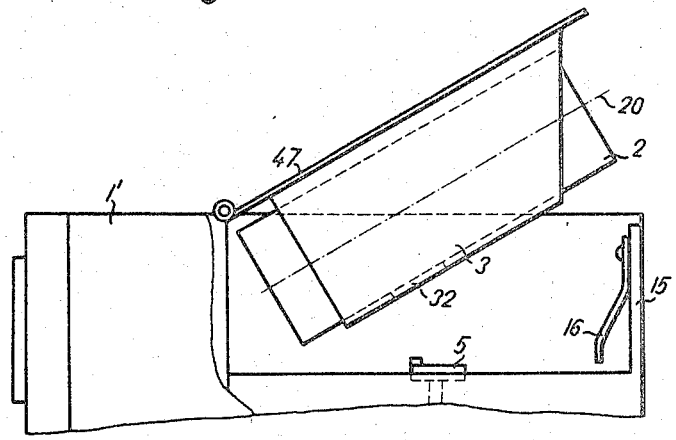
FIG. 6 shows a further embodiment of the invention in a view similar to that of FIG. 2.

A particularly simple embodiment of the invention is shown in FIG. 6. The guide sleeve 3 is attached to a door 47 by solder joints, not visible on the scale of the drawing, which provide a linkage between the sleeve and the door. The door 47 opens and closes an access opening in a side wall of a camera casing 1' otherwise closely similar to the aforedescribed casing 1 and carrying an optical system not visible in FIG. 6. The optical axis is aligned with the longitudinal axis 20 of a magazine 2 received in the sleeve 3 when the door 47 with the sleeve 3 thereon is swung clockwise from the illustrated open position toward the closing position in which a drive claw 5 passes through an opening 32 in the sleeve 3 into a corresponding female coupling member in the magazine 2, as is conventional.

A leaf spring 16 mounted on the fixed rear wall 15 of the casing 1' moves the magazine 2 forward against resilient abutments identical with the aforedescribed abutments 12, but not seen in FIG. 6, while the door 47 is being closed, thereby aligning the non-illustrated coupling element in the magazine 2 with the claw 5.

It is a common feature of the several aforedescribed motion picture cameras of the invention that insertion of the magazine involves no more than rectilinear introduction of the magazine 2 into a conforming sleeve 3 to a depth which is not critical, and the closing of a door 4, 47 on the camera casing. These operations are readily performed by any novice photographer and leave no margin for human error. The axes of the optical camera system and of the magazine are aligned by abutment of the sleeve against the abutments 13 on the camera casing (omitted from the showing of FIG. 6), and the magazine is axially aligned with the focal plane of the optical system by the abutments 12 and by springs 14, 16 which move the magazine axially against the abutments if it was not introduced deeply enough into the sleeve 3 by the photographer. If the magazine is pushed too deeply into the sleeve, its position is corrected by abutting engagement of the magazine front wall 21 with the abutments 12. Removal of the magazine is equally simple, and involves no more than the release of a latch 74, the opening of a door 4, 47, and the rectilinear withdrawal of the magazine from its guide sleeve 3 through the access opening of the camera casing 1, 1'. The drive coupling is automatically engaged and disengaged during the pivotal movement of the sleeve 3.

Linkages between a door on a camera casing and a movably mounted guide sleeve dimensioned to receive a film magazine in conforming engagement other than those illustrated in the drawing and described hereinabove will readily suggest themselves to those skilled in the art. It is to be understood, therefore, that the foregoing disclosure relates only to preferred embodiments of the invention, and that it is intended to cover all changes and variations of the examples of the invention herein chosen for the purpose of the disclosure which do not constitute departures from the spirit and scope of the invention set forth in the appended claims.

I claim:

1. In a magazine-loading motion picture camera having a casing formed with a cavity and with an access opening for insertion of a film-bearing magazine into said cavity, a door mounted on said casing for movement toward and away from a closing postion in which said door obstructs said access opening, an optical system on said casing, and locating means for locating said magazine in alignment with the optical axis of said optical system, the improvement in the locating means which comprises:

(a) a guide member dimensioned to receive said magazine in conforming engagement;
(b) securing means securing said guide member in said cavity for movement relative to said casing between an inoperative and an operative position,
  (1) said guide member when in the inoperative position being aligned with said access opening for receiving said magazine through the opening.
  (2) the guide member when in the operative position holding a magazine received thereby in alignment with said optical axis; and
(c) linkage means connecting said door to said guide member for moving the guide member from the inoperative to the operative position thereof when said door moves toward said closing position,
  (1) whereby a magazine may be received by the guide member through said access opening when the door is moved away from the closing position, and the magazine is located in alignment with said optical axis when the door is moved to the closing position.

2. In a camera as set forth in claim 1, said securing means including pivot means securing said guide member to said casing for angular movement about a pivot axis transverse of said optical axis.

3. In a camera as set forth in claim 2, said access opening being spaced from said optical system in the direction of said optical axis, and said pivot axis being nearer said optical system than said opening.

4. In a camera as set forth in claim 1, said securing means including frame means formed with a plurality of guide slots in a fixed spatial relationship to said casing, and guide pins on said guide member received in said slots for movement therein when said guide member is moved by said linkage means between said operative and inoperative positions.

5. In a camera as set forth in claim 1, bracket means pivotally mounted on said casing, said door being attached to said bracket means for angular movement therewith toward and away from said closing position, said linkage means including cam means on said bracket means, and cam follower means on said guide member engaging said cam means.

6. In a camera as set forth in claim 1, a lever member pivotally mounted on said casing, said door being attached to said lever member for angular movement therewith toward and away from said closing position, said linkage means including a link member hingedly connected to said lever member and to said guide member.

7. In a camera as set forth in claim 1, an arm member pivotally mounted on said casing, said door being attached to said arm member for angular movement therewith about a first axis toward and away from said closing position, said securing means including pivot means securing said guide member to said casing for angular movement about a second axis, said linkage means including meshingly engaged gear means on said guide member and said arm member respectively.

8. In a camera as set forth in claim 1, said linkage means including means fixedly fastening said guide member to said door for movement therewith, said securing means securing said door to said casing for movement toward and away from said closing position.

References Cited

UNITED STATES PATENTS 3,017,804   1/1962   Bonisch et al. _____ 352—72
3,085,467   4/1963   Mayer _____ 352—72

JULIA E. COINER, Primary Examiner

U.S. Cl. X.R.

352—73